Dec. 2, 1947.  R. J. SCHUMACHER  2,431,774
BRAKE
Filed Dec. 22, 1944  2 Sheets-Sheet 1

Reuben J. Schumacher
INVENTOR

BY
ATTORNEY

Dec. 2, 1947.   R. J. SCHUMACHER   2,431,774
BRAKE
Filed Dec. 22, 1944   2 Sheets-Sheet 2
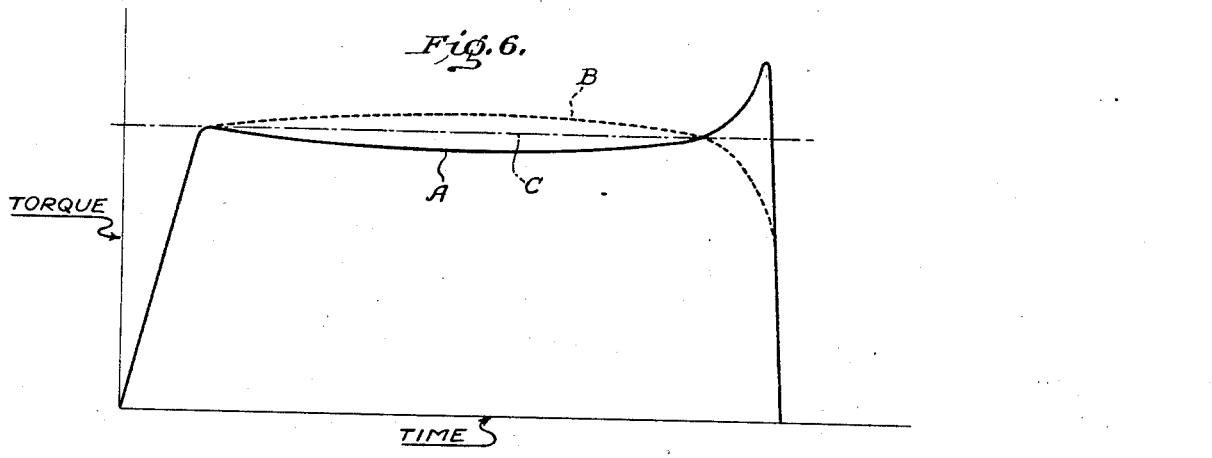
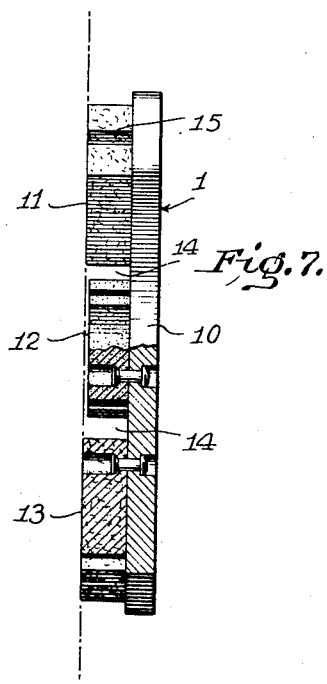
Reuben J. Schumacher
INVENTOR
BY John P. Barbop
ATTORNEY Patented Dec. 2, 1947

2,431,774

UNITED STATES PATENT OFFICE 2,431,774

BRAKE

Reuben J. Schumacher, Detroit, Mich., assignor to The Budd Company, Philadelphia, Pa., a corporation of Pennsylvania Application December 22, 1944, Serial No. 569,303

4 Claims. (Cl. 188—250)

1

The invention relates to brakes and brake shoes therefor and more particularly to brakes having a rotary metallic braking member and shoes employing a composite lining for engaging said member.

It is an object of the inention to provide a brake and particularly a shoe of this class, which is longer wearing and which provides a more efficient braking action, particularly under heavy duty braking, such as is required in stopping high speed trains.

It is a further object of the invention to provide a brake of this class which operates most effectively under varying conditions of braking, such as alternate light and heavy applications.

It is a further object of the invention to provide a brake of this class which is less likely to develop heat checks or otherwise mar the surface of the metallic member being braked.

These objects are attained in large part by providing a shoe with a plurality of different quality brake lining pads arranged alternately and secured to a metal backing plate forming the body of the shoe. To provide adequate cooling around and across the shoe, the pads are spaced apart. The best material for comprising the respective pads at present known to the inventor comprise alternate pads of lining having different braking characteristics such as alternate pads of a woven lining and a molded lining. All such linings have asbestos fibre as a base and differ mainly in the manner in which the asbestos is incorporated with the other elements of the lining.

They differ in their braking characteristics some, such as the woven lining being more yielding than others, such as the molded lining. Also, certain linings such as most woven linings have been found to be more effective under light brake applications continued over a period of time, since they have the characteristic of exerting a scouring action on the rotary metal brake member cooperating therewith, while other linings such as molded linings are more likely to glaze the brake member, particularly under light applications and if used alone, but are more effective and wear longer under heavy brake applications. Also, the different qualities of linings have different torque characteristics, the torque curve of certain linings, such as molded linings, having a tendency to rise slightly during a prolonged brake application and then drop rather suddenly as the member being braked is brought to a stop. Other linings, such as woven linings, on the other hand have a torque curve which drops somewhat during a prolonged brake application and then rises rather rapidly as the member is being stopped, and finally drops off sharply to the stop. By utilizing braking pads of these different quality linings on the same shoe and alternately, the desirable qualities of the various linings are retained and the torque curve produced by the combined linings is substantially a straight horizontal line indicating a uniform torque during the entire brake application and at all speeds.

Other and further objects and advantages and the manner in which they are attained will become apparent from the following detailed description when read in connection with the drawings forming a part of this specification.

In the drawings:

Fig. 6 is a comparative diagram of the approximate torque curves developed by the respective different quality linings and the resultant torque curve produced by the combination of the linings according to the invention.

Fig. 7 is a view similar to Fig. 5 showing the relative depth of the different quality linings after a heavy application of the brakes.

While the brake shoe of the invention has been shown applied to a specific disc form of brake, it will be understood that the invention is equally applicable to other types of brakes, such as drum or wheel tread brakes.

Figure 1:
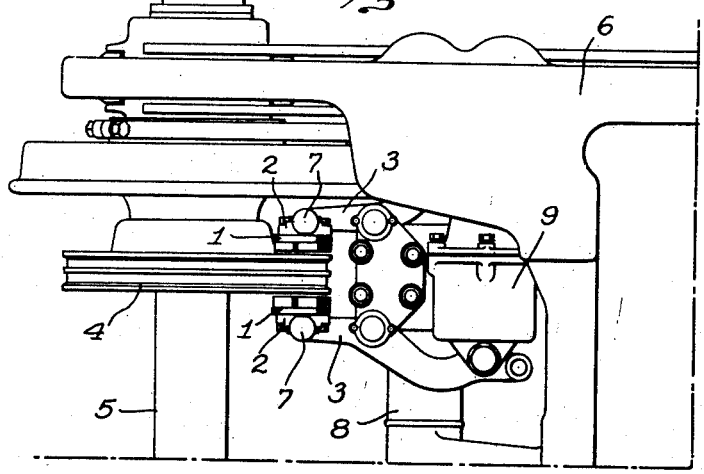
Fig. 1 shows a quarter-plan view of a railway truck and a brake thereon in which the invention finds application.

In the drawings, the brake shoe of the invention is designated generally by the numeral 1 and is carried by a suitable head 2 which is in turn pivotally supported by a brake lever 3. As shown in Fig. 1, the brake shoes, brake heads and brake levers are arranged in pairs, one of said shoes being in cooperative relation to each of the opposite radial faces of a brake disc 4 secured to rotate with the wheel and axle assembly 5 from which the truck frame 6 is supported in a well known manner. The brake shoes 2, 2 are pivoted at 7, 7 on the levers 3. 3 pivotally connected to a brake support 8 carried in this instance by the wheel and axle assembly and the truck frame in a manner well understood in the art. The levers are actuated by a usual cylinder actuator 9 supported between them.

Figure 2:
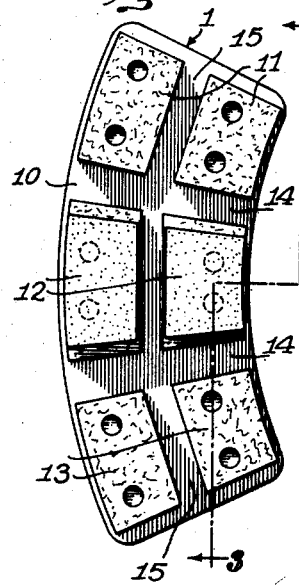
Fig. 2 is a face view of a brake shoe such as may be utilized in a truck brake of the type shown in Fig. 1 showing one form of the invention.
Figure 3:
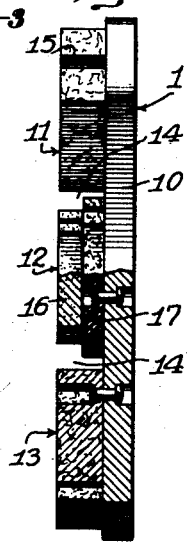
Fig. 3 is an edge view of the shoe of Fig. 2 with part shown in section, the section being taken substantially along the line 3—3 of Fig. 2.

The shoe proper 1 comprises an arcuate segmental backing plate 10, in this instance carrying on its side facing the disc 4 a series of spaced brake lining pads, three in number, providing radial ventilating grooves 14 between them and designated from top to bottom in Figs. 2 and 3 as 11, 12 and 13. Each pad may again be divided by a circumferential groove 15 into a pair of radially outer and inner pads. The end pairs of pads are, according to the invention, comprised of one quality of lining. such as woven lining, while the intermediate pair of pads, each have their braking faces formed by a layer 16 of hard, relatively non-yielding material, such as molded lining, backed by a layer 17 of resilient material. such as woven lining. It has been found that this combination gives most effective braking results with a minimum of wear of the lining and the combination of different quality linings aided by the radial and circumferential passages between the lining pads also provides effective cooling, and less liability of heat checks or cracks in the braking face of the disc, where the effect of the high heat developed by the braking is most deleterious.

Figure 4:
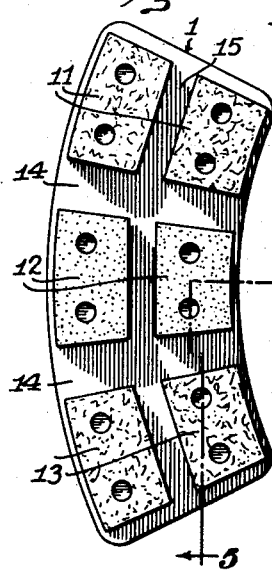
Figs. 4 and 5 are views, respectively, similar to Figs. 2 and 3 of a slight modification.
Figure 5:
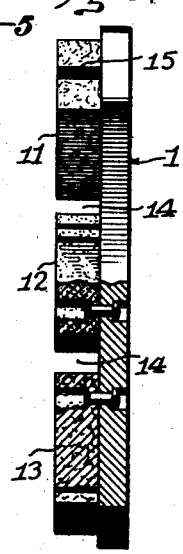

As an alternative to the form shown in Figs. 2 and 3, the form shown in Figs. 4 and 5 may be used. This form differs from the form in Figs. 2 and 3 in the fact that the intermediate pads are made of the same material, i. e., molded lining, for their full depth. Under certain conditions of braking, where heavy brake applications are followed by a series of light applications, this form may be preferable to the form shown in Figs. 2 and 3.

In Fig. 7 is shown the form of shoe shown in Fig. 5 after it has been subjected to a heavy brake application. It will be seen that the faces of the more compressible and expandible woven lining pads project beyond the faces of the molded lining pads. This is desirable if a series of light applications follow, for then the braking will be wholly on the woven lining pads, which exert a scouring action on the disc and keep it clean under such light application, while the molded lining tends to glaze under light applications. When all the pads are bearing on the disc, as in normally heavy application, the outside arrangement of the woven lining pads at all times prevents any glazing tendency of the molded lining.

Thus the two different quality linings supplement each other and their combined use in a brake shoe produces a shoe of superior performance and increased life, because of the longer wear which the mixed linings provide.

The superior performance of the shoe according to the invention is diagrammatically shown in the torque curves of Fig. 6 where curve A corresponds roughly to the torque curve during a stop of a shoe lined entirely with woven lining, dotted line curve B to a similar curve resulting from the use solely of a molded lining, and the resultant dot-and-dash line curve C corresponding to the curve of the mixed lining shoe of the invention which is almost a straight line during most of the braking period, indicating that the shoe of the invention produces a substantially uniform torque to the end of the stop, and corrects for variations in torque produced particularly near the end of a stop, by shoes using the different quality linings alone.

While the invention has been herein described in detail in several specific forms, it will be understood that changes and modifications may be made by those skilled in the art without departing from the main features of the invention, and such changes and modifications are intended to be covered by the appended claims.

What is claimed is:

1. A friction brake for heavy duty braking, such as is required for the stopping of high speed trains, and comprising a rotary metallic braking member having a radial braking face, and a segmental arcuate non-rotary braking member having a rigid backing faced by a composition lining adapted to engage the braking face of said rotary member to effect the braking, characterized by the fact that the composition lining comprises spaced end and intermediate pads having different braking characteristics, the end pads having generally the characteristics of a woven lining, such as greater yieldability, a greater scouring action on the braking face of the rotary member and less tendency to glaze said face under light brake applications, than said intermediate pad or pads, and the intermediate pad or pads having generally the characteristics of a molded lining, being less yielding and having longer wear characteristics than said end pads, the torque characteristics of said different lining pads being such that the resultant torque is substantially uniform at all speeds.

2. A friction brake for heavy-duty braking, such as is required for the stopping of high-speed trains, comprising a rotary metallic braking member having a braking face, and a segmental arcuate non-rotary braking member having a rigid backing faced by a composition lining adapted to engage the braking face of said rotary member to effect the braking, characterized by the fact that the composition lining comprises spaced end and intermediate pads having different braking characteristics, the end pads having generally the characteristics of a woven lining, such as greater yieldability, a greater scouring action on the braking face of the rotary member and less tendency to glaze said face under light brake applications, than said intermediate pad or pads, and the intermediate pad or pads having generally the characteristics of a molded lining, being less yielding and having longer wear characteristics than said end pads, the torque characteristics of said different lining pads being such that the resultant torque is substantially uniform at all speeds.

3. A friction brake for heavy-duty braking, such as is required for the stopping of high-speed trains, comprising a rotary metallic braking member having a braking face, and a segmental arcuate non-rotary braking member having a rigid backing faced by a composition lining adapted to engage the braking face of said rotary member to effect the braking, characterized by the fact that the composition lining comprises spaced end pads and at least one intermediate pad having different braking characteristics, the end pads having generally the characteristics of a woven lining, such as greater yieldability, a greater scouring action on the braking face of the rotary member, and less tendency to glaze said face under light brake applications than the intermediate pad of different braking characteristics, and said intermediate pad of different braking characteristics having generally the characteristics of a molded lining, being less yieldable and having longer wear characteristics than said end pads, the torque characteristics of said different lining pads being such that the resultant torque is substantially uniform at all speeds.

4. A friction brake for heavy-duty braking, such as is required for the stopping of high-speed trains, comprising a rotary metallic braking member having a braking face, and a segmental arcuate non-rotary braking member having a rigid backing faced by a composition lining adapted to engage the braking face of said rotary member to effect the braking, characterized by the fact that the composition lining comprises spaced end pads and at least one intermediate pad having different braking characteristics, the end pads consisting essentially of a woven lining and an intermediate pad consisting essentially of a molded lining.

REUBEN J. SCHUMACHER.

REFERENCES CITED

The following references are of record in the file of this patent:

UNITED STATES PATENTS

| Number | Name | Date |
|---|---|---|
| 2,355,419 | Bruce | Aug. 8, 1944 |
| 2,236,311 | Eksergian | Mar. 25, 1941 |
| 1,847,680 | Thompson | Mar. 1, 1932 |
| 2,016,280 | Gatke | Oct. 8, 1935 |